(12) United States Patent
Hendry et al.

(10) Patent No.: US 12,519,928 B2
(45) Date of Patent: Jan. 6, 2026

(54) IMAGE CODING METHOD AND DEVICE THEREFOR

(71) Applicant: LG ELECTRONICS INC., Seoul (KR)

(72) Inventors: Hendry Hendry, Seoul (KR); Hyeongmoon Jang, Seoul (KR); Junghak Nam, Seoul (KR); Seunghwan Kim, Seoul (KR); Jaehyun Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 227 days.

(21) Appl. No.: 17/926,402

(22) PCT Filed: May 21, 2021

(86) PCT No.: PCT/KR2021/006366
§ 371 (c)(1),
(2) Date: Nov. 18, 2022

(87) PCT Pub. No.: WO2021/235895
PCT Pub. Date: Nov. 25, 2021

(65) Prior Publication Data
US 2023/0188707 A1 Jun. 15, 2023

Related U.S. Application Data

(60) Provisional application No. 63/028,596, filed on May 22, 2020.

(51) Int. Cl.
*H04N 19/105* (2014.01)
*H04N 19/132* (2014.01)
(Continued)

(52) U.S. Cl.
CPC ......... *H04N 19/105* (2014.11); *H04N 19/132* (2014.11); *H04N 19/159* (2014.11);
(Continued)

(58) Field of Classification Search
CPC .. H04N 19/105; H04N 19/132; H04N 19/159; H04N 19/172; H04N 19/176;
(Continued)

(56) References Cited

U.S. PATENT DOCUMENTS 9,432,665 B2 * 8/2016 Wang ............... H04N 19/50
10,158,888 B2 * 12/2018 Rhyu ............... H04N 21/4325
(Continued)

FOREIGN PATENT DOCUMENTS

| KR | 10-2015-0043977 A | 4/2015 |
| KR | 10-2015-0048077 A | 5/2015 |
| KR | 101981712 B1 | 5/2019 |

OTHER PUBLICATIONS

ISO/IEC; Oct. 1, 2004; ISO/IEC; ISO/IEC 14406-10 Information technology—Coding of audio-visual objects—Part 10: Advanced Video Coding; 2nd edition; pp. 1-280.*

(Continued)

*Primary Examiner* — Peter D Le
(74) *Attorney, Agent, or Firm* — BRYAN CAVE LEIGHTON PAISNER LLP

(57) ABSTRACT

An image decoding method according to the present document comprises a step of deriving POC values for the current picture and reference pictures on the basis of POC information, wherein the POC information includes a maximum LSB value of POC, information about the reference pictures includes a non-reference picture flag related to whether a picture is not used as a reference picture, the value of the non-reference picture flag of the previous picture used for deriving the POC value of the current picture is zero, and the (Continued)

difference between the POC values of the current picture and the previous picture is less than half of the maximum LSB value of POC.

9 Claims, 10 Drawing Sheets

(51) Int. Cl.
    *H04N 19/159*     (2014.01)
    *H04N 19/172*     (2014.01)
    *H04N 19/176*     (2014.01)
    *H04N 19/31*     (2014.01)
    *H04N 19/46*     (2014.01)
    *H04N 19/503*     (2014.01)

(52) U.S. Cl.
    CPC ......... *H04N 19/172* (2014.11); *H04N 19/176* (2014.11); *H04N 19/31* (2014.11); *H04N 19/46* (2014.11); *H04N 19/503* (2014.11)

(58) Field of Classification Search
    CPC ...... H04N 19/31; H04N 19/46; H04N 19/503; H04N 19/573; H04N 19/70
    See application file for complete search history.

(56) References Cited

U.S. PATENT DOCUMENTS

| | | | |
|---|---|---|---|
| 11,228,776 B1* | 1/2022 | Choi | H04N 19/44 |
| 2007/0280350 A1* | 12/2007 | Mathew | H04N 19/187 |
| | | | 375/240.03 |
| 2009/0252218 A1* | 10/2009 | Nakagawa | H04N 19/70 |
| | | | 375/E7.026 |
| 2013/0077687 A1* | 3/2013 | Wang | H04N 19/70 |
| | | | 375/E7.243 |
| 2013/0188738 A1* | 7/2013 | Hannuksela | H04N 19/31 |
| | | | 375/240.25 |
| 2014/0064363 A1* | 3/2014 | Samuelsson | H04N 19/46 |
| | | | 375/240.12 |
| 2014/0072038 A1* | 3/2014 | Samuelsson | H04N 19/503 |
| | | | 375/240.12 |
| 2014/0079138 A1* | 3/2014 | Auyeung | H04N 19/00 |
| | | | 375/240.01 |
| 2014/0119712 A1* | 5/2014 | Jang | G11B 27/105 |
| | | | 386/248 |
| 2014/0192149 A1* | 7/2014 | Wang | H04N 19/30 |
| | | | 348/43 |
| 2014/0286416 A1* | 9/2014 | Jeon | H04N 19/593 |
| | | | 375/240.12 |
| 2014/0288416 A1 | 9/2014 | Mahoney et al. | |
| 2014/0301473 A1* | 10/2014 | Park | H04N 19/58 |
| | | | 375/240.16 |
| 2015/0103881 A1* | 4/2015 | Hendry | H04N 19/423 |
| | | | 375/240.02 |
| 2015/0103923 A1* | 4/2015 | Ramasubramonian | |
| | | | H04N 19/68 |
| | | | 375/240.26 |
| 2015/0172667 A1* | 6/2015 | Hendry | H04N 19/90 |
| | | | 375/240.25 |
| 2015/0304671 A1 | 10/2015 | Deshpande | |
| 2015/0326866 A1* | 11/2015 | Ikai | H04N 19/174 |
| | | | 375/240.25 |
| 2017/0302949 A1 | 10/2017 | Malamal Vadakital et al. | |
| 2018/0199051 A1 | 7/2018 | Hannuksela et al. | |
| 2019/0379903 A1 | 12/2019 | Sullivan et al. | |
| 2023/0077443 A1* | 3/2023 | Wang | H04N 19/46 |
| | | | 375/240.26 |

OTHER PUBLICATIONS

ISO/IEC 14496-10.*
Bross et al. "Versatile Video Coding (Draft 9)," ITU-T SG 16 WP 3 and ISO/IEC JTC 1/SC 29/WG 11, JVET-R2001-v9, 525 pages, Apr. 2020.
Hendry et al. "AHG9: On non-referenced picture and POC derivation," ITU-T SG 16 WP 3 and ISO/IEC JTC 1/SC 29/WG 11, JVET-S0081, 3 pages, Jul. 2020.
Byeongdoo Choi, et al., "AHG9: On picture output for non-reference pictures", Joint Video Experts Team (JVET) of ITU-T SG 16 WP 3 and ISO/IEC JTC 1/SC 29/WG 11, 18th Meeting: by teleconference, Apr. 15-24, 2020. JVET-R0122.

* cited by examiner

IMAGE CODING METHOD AND DEVICE THEREFOR

CROSS-REFERENCE TO RELATED APPLICATION

This application is the National Stage filing under 35 U.S.C. 371 of International Application No. PCT/KR2021/006366, filed May 21, 2021, which claims priority to and the benefit of U.S. Provisional Application No. 63/028,596, filed May 22, 2020, the disclosure of which is incorporated herein by reference in its entirety.

BACKGROUND OF THE DISCLOSURE

Field of the Disclosure

The present disclosure relates to an image coding technique and, more particularly, to a method and an apparatus for coding an image based on POC for a picture in an image coding system.

Related Art

Nowadays, the demand for high-resolution and high-quality images/videos such as 4K, 8K or more ultra high definition (UHD) images/videos has been increasing in various fields. As the image/video data becomes higher resolution and higher quality, the transmitted information amount or bit amount increases as compared to the conventional image data. Therefore, when image data is transmitted using a medium such as a conventional wired/wireless broadband line or image/video data is stored using an existing storage medium, the transmission cost and the storage cost thereof are increased.

Further, nowadays, the interest and demand for immersive media such as virtual reality (VR), artificial reality (AR) content or hologram, or the like is increasing, and broadcasting for images/videos having image features different from those of real images, such as a game image is increasing.

Accordingly, there is a need for a highly efficient image/video compression technique for effectively compressing and transmitting or storing, and reproducing information of high resolution and high quality images/videos having various features as described above.

SUMMARY

A technical aspect of the present disclosure is to provide a method and an apparatus for increasing image coding efficiency.

The present disclosure also provides a method and apparatus for improving a POC decoding efficiency of a picture.

The present disclosure also provides a method and apparatus for improving efficiency of an inter prediction by not using a reference picture which is deleted in a system.

The present disclosure is also to reduce error occurrence and stabilize a network by restricting a POC value between a current picture and a reference picture.

In an aspect, an image decoding method performed by a decoding apparatus is provided. The method includes: receiving POC information and information on reference pictures from the bitstream; deriving POC values for a current picture and reference pictures based on the POC information; constructing a reference picture list based on a POC value of the current picture and POC values for the reference pictures; deriving prediction samples for the current block by performing an inter prediction on the current block based on the reference picture list; and generating a reconstructed picture based on the prediction samples, wherein the POC information includes the maximum LSB value of POC, and the information on the reference pictures includes a non-reference picture flag related to whether a picture is not used as a reference picture, wherein the value of the non-reference picture flag of a previous picture used to derive the POC value of the current picture is 0, and wherein the difference between the POC value of the current picture and the previous picture is less than half of the maximum LSB value of the POC.

Layer IDs for the current picture and the previous picture may be the same, and a temporal ID derived from identification information of a temporal layer for the previous picture may be 0.

The previous picture may not be a RASL picture nor a RADL picture.

The POC value of the current picture may be derived based on a variable POCMsb and a POC LSB information value for the current picture, and the variable POCMsb may be derived based on a cycle present flag related to whether a POC MSB cycle value is present and the POC MSB cycle value signaled based on the cycle present flag value.

When the value of the cycle present flag for the current picture is 0 and the current picture is not a CLVSS picture, the variable POCMsb for the current picture may be derived based on the variable POCMsb of the previous picture.

In another aspect, an image encoding method performed by an encoding apparatus is provided. The method includes: deriving POC values for a current picture and reference pictures; performing an inter prediction on the current block using the reference pictures; and encoding POC information and information on the reference pictures, wherein the POC information includes the maximum LSB value of a POC and the information on the reference pictures includes a non-reference picture flag related to whether a picture is not used as a reference picture, wherein the value of the non-reference picture flag of a previous picture used to derive the POC value of the current picture is 0, and wherein the difference between the POC value of the current picture and the previous picture is less than half of the maximum LSB value of the POC.

According to still another embodiment of the present disclosure, there may be provided a digital storage medium that stores image data including encoded image information and/or a bitstream generated according to an image encoding method performed by an encoding apparatus.

According to yet another embodiment of the present disclosure, there may be provided a digital storage medium that stores image data including encoded image information and/or a bitstream to cause a decoding apparatus to perform the image decoding method.

Advantageous Effects

According to the present disclosure, it is possible to increase overall image/video compression efficiency.

According to the present disclosure, POC decoding efficiency of a picture may be improved.

According to the present disclosure, a reference picture which is deleted in a system is not used, and therefore, efficiency of an inter prediction may be improved.

According to the present disclosure, a POC value between a current picture and a reference picture is restricted, and therefore, error occurrence may be reduced, and a network may be stabilized.

Effects that can be obtained through specific examples of the present specification are not limited to the effects listed above. For example, various technical effects that a person having ordinary skill in the related art can understand or derive from the present specification may exist. Accordingly, specific effects of the present specification are not limited to those explicitly described in the present specification, and can include various effects that can be understood or derived from the technical characteristics of the present specification.

DESCRIPTION OF EXEMPLARY EMBODIMENTS

Figure 1:
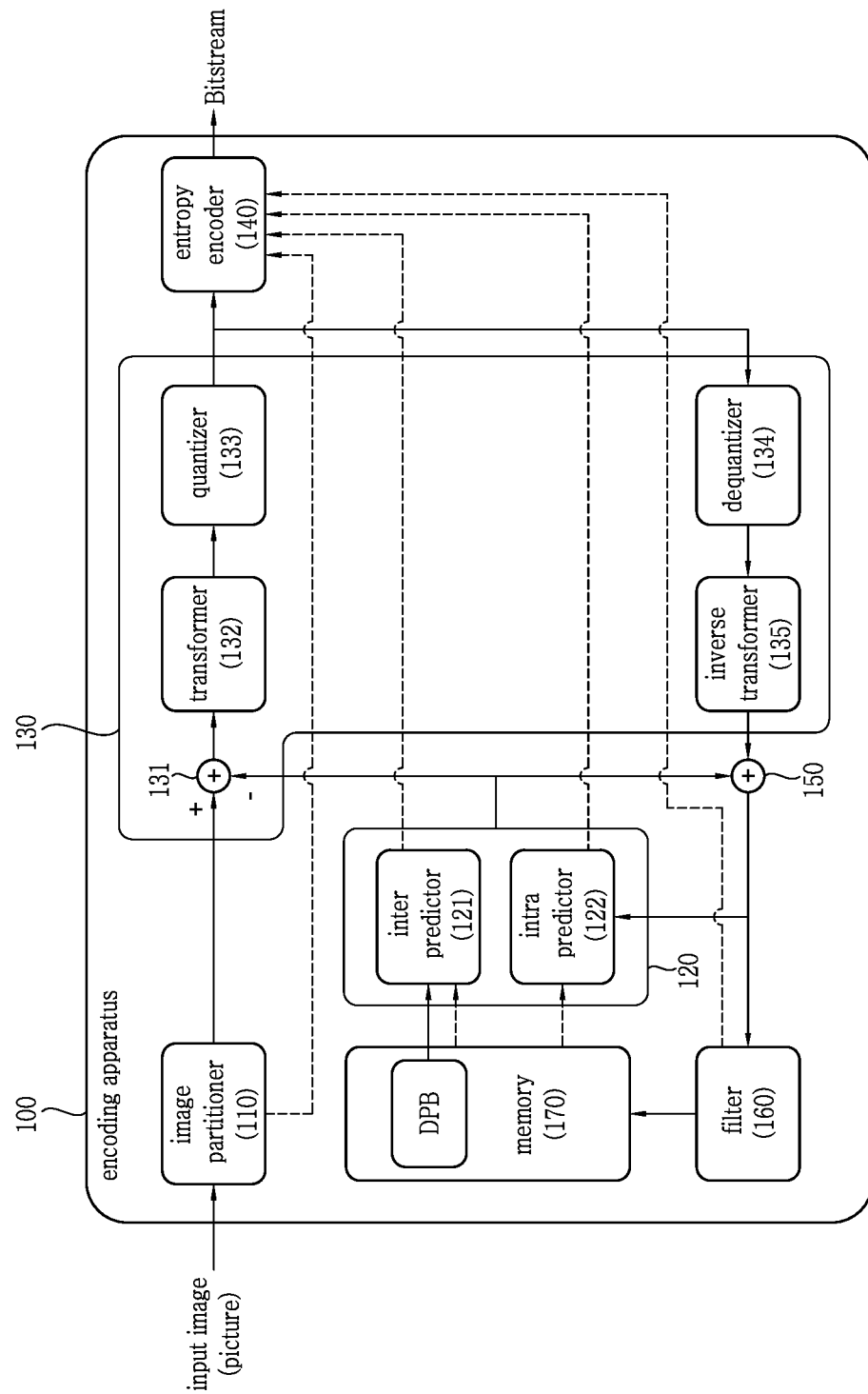
FIG. 1 is a schematic diagram illustrating a configuration of a video/image encoding apparatus to which the present disclosure may be applied.

While the present disclosure may be susceptible to various modifications and include various embodiments, specific embodiments thereof have been shown in the drawings by way of example and will now be described in detail. However, this is not intended to limit the present disclosure to the specific embodiments disclosed herein. The terminology used herein is for the purpose of describing specific embodiments only, and is not intended to limit technical idea of the present disclosure. The singular forms may include the plural forms unless the context clearly indicates otherwise. The terms such as "include" and "have" are intended to indicate that features, numbers, steps, operations, elements, components, or combinations thereof used in the following description exist, and thus should not be understood as that the possibility of existence or addition of one or more different features, numbers, steps, operations, elements, components, or combinations thereof is excluded in advance.

Meanwhile, each component on the drawings described herein is illustrated independently for convenience of description as to characteristic functions different from each other, and however, it is not meant that each component is realized by a separate hardware or software. For example, any two or more of these components may be combined to form a single component, and any single component may be divided into plural components. The embodiments in which components are combined and/or divided will belong to the scope of the patent right of the present disclosure as long as they do not depart from the essence of the present disclosure.

Hereinafter, preferred embodiments of the present disclosure will be explained in more detail while referring to the attached drawings. In addition, the same reference signs are used for the same components on the drawings, and repeated descriptions for the same components will be omitted.

This document relates to video/image coding. For example, the method/example disclosed in this document may relate to a VVC (Versatile Video Coding) standard (ITU-T Rec. H.266), a next-generation video/image coding standard after VVC, or other video coding related standards (e.g., HEVC (High Efficiency Video Coding) standard (ITU-T Rec. H.265), EVC (essential video coding) standard, AVS2 standard, etc.).

In this document, a variety of embodiments relating to video/image coding may be provided, and, unless specified to the contrary, the embodiments may be combined to each other and be performed.

In this document, a video may mean a set of a series of images over time. Generally a picture means a unit representing an image at a specific time zone, and a slice/tile is a unit constituting a part of the picture. The slice/tile may include one or more coding tree units (CTUs). One picture may be constituted by one or more slices/tiles. One picture may be constituted by one or more tile groups. One tile group may include one or more tiles.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component. Alternatively, the sample may refer to a pixel value in the spatial domain, or when this pixel value is converted to the frequency domain, it may refer to a transform coefficient in the frequency domain.

A unit may represent the basic unit of image processing. The unit may include at least one of a specific region and information related to the region. One unit may include one luma block and two chroma (e.g., cb, cr) blocks. The unit and a term such as a block, an area, or the like may be used in place of each other according to circumstances. In a general case, an M×N block may include a set (or an array) of samples (or sample arrays) or transform coefficients consisting of M columns and N rows.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C."

Further, in the document, the term "or" should be interpreted to indicate "and/or." For instance, the expression "A or B" may include 1) only A, 2) only B, and/or 3) both A and B. In other words, the term "or" in this document should be interpreted to indicate "additionally or alternatively."

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "prediction (intra prediction)", it may mean that "intra prediction" is proposed as an example of "prediction". In other words, the "prediction" of the present disclosure is not limited to "intra prediction", and "intra prediction" may be proposed as an example of "prediction". In addition, when indicated as "prediction (i.e., intra prediction)", it may also mean that "intra prediction" is proposed as an example of "prediction".

Technical features individually described in one figure in the present disclosure may be individually implemented or may be simultaneously implemented.

FIG. 1 is a diagram schematically explaining a configuration of a video/image encoding apparatus to which embodiments of the present disclosure are applicable. Hereinafter, what is referred to as the video encoding apparatus may include an image encoding apparatus.

Referring to FIG. 1, an encoding apparatus 100 may include and be configured with an image partitioner 110, a predictor 120, a residual processor 130, an entropy encoder 140, an adder 150, a filter 160, and a memory 170. The predictor 120 may include an inter predictor 121 and an intra predictor 122. The residual processor 130 may include a transformer 132, a quantizer 133, a dequantizer 134, and an inverse transformer 135. The residual processor 130 may further include a subtractor 131. The adder 150 may be called a reconstructor or a reconstructed block generator. The image partitioner 110, the predictor 120, the residual processor 130, the entropy encoder 140, the adder 150, and the filter 160, which have been described above, may be configured by one or more hardware components (e.g., encoder chipsets or processors) according to an embodiment. In addition, the memory 170 may include a decoded picture buffer (DPB), and may also be configured by a digital storage medium. The hardware component may further include the memory 170 as an internal/external component.

The image partitioner 110 may split an input image (or, picture, frame) input to the encoding apparatus 100 into one or more processing units. As an example, the processing unit may be called a coding unit (CU). In this case, the coding unit may be recursively split according to a quad-tree binary-tree ternary-tree (QTBTTT) structure from a coding tree unit (CTU) or a largest coding unit (LCU). For example, one coding unit may be split into a plurality of coding units of a deeper depth based on a quad-tree structure, a binary-tree structure, and/or a ternary-tree structure. In this case, for example, the quad-tree structure may be applied first and the binary-tree structure and/or the ternary-tree structure may be applied later. Alternatively, the binary-tree structure may also be applied first. A coding procedure according to this document may be performed based on a final coding unit which is not split any more. In this case, based on coding efficiency according to image characteristics or the like, the LCU may be directly used as the final coding unit, or optionally, the coding unit may be recursively split into coding units of a deeper depth, such that a coding unit having an optimal size may be used as the final coding unit.

Here, the coding procedure may include a procedure such as prediction, transform, and reconstruction to be described later. As another example, the processing unit may further include a prediction unit (PU) or a transform unit (TU). In this case, each of the PU and the TU may be split or partitioned from the aforementioned final coding unit. The PU may be a unit for sample prediction, and the TU may be a unit for inducing a transform coefficient and/or a unit for inducing a residual signal from the transform coefficient.

The unit may be interchangeably used with the term such as a block or an area in some cases. Generally, an M×N block may represent samples composed of M columns and N rows or a group of transform coefficients. The sample may generally represent a pixel or a value of the pixel, and may also represent only the pixel/pixel value of a luma component and also represent only the pixel/pixel value of a chroma component. The sample may be used as the term corresponding to a pixel or a pel configuring one picture (or image).

The encoding apparatus 100 may generate a residual signal (residual block, residual sample array) by subtracting a predicted signal (predicted block, prediction sample array) output from the inter predictor 121 or the intra predictor 122 from the input image signal (original block, original sample array), and the generated residual signal is transmitted to the transformer 132. In this case, as illustrated, the unit for subtracting the predicted signal (predicted block, prediction sample array) from the input image signal (original block, original sample array) within an encoder 100 may be called the subtractor 131. The predictor may perform prediction for a block to be processed (hereinafter, referred to as a current block), and generate a predicted block including prediction samples of the current block. The predictor may determine whether intra prediction is applied or inter prediction is applied in units of the current block or the CU. The predictor may generate various information about prediction, such as prediction mode information, to transfer the generated information to the entropy encoder 140 as described later in the description of each prediction mode. The information about prediction may be encoded by the entropy encoder 140 and may be output in the form of a bitstream.

The intra predictor 122 may predict a current block with reference to samples within a current picture. The referenced samples may be located neighboring to the current block, or may also be located away from the current block according to the prediction mode. The prediction modes in the intra prediction may include a plurality of non-directional modes and a plurality of directional modes. The non-directional mode may include, for example, a DC mode or a planar mode. The directional mode may include, for example, 33 directional prediction modes or 65 directional prediction modes according to the fine degree of the prediction direction. However, this is illustrative and the directional prediction modes which are more or less than the above number may be used according to the setting. The intra predictor 122 may also determine the prediction mode applied to the current block using the prediction mode applied to the neighboring block.

The inter predictor 121 may induce a predicted block of the current block based on a reference block (reference sample array) specified by a motion vector on a reference picture. At this time, in order to decrease the amount of motion information transmitted in the inter prediction mode, the motion information may be predicted in units of a block, a sub-block, or a sample based on the correlation of the motion information between the neighboring block and the current block. The motion information may include a motion vector and a reference picture index. The motion information may further include inter prediction direction (L0 prediction, L1 prediction, Bi prediction, or the like) information. In the case of the inter prediction, the neighboring block may include a spatial neighboring block existing within the current picture and a temporal neighboring block existing in the reference picture. The reference picture including the reference block and the reference picture including the temporal neighboring block may also be the same as each other, and may also be different from each other. The temporal neighboring block may be called the name such as a collocated reference block, a collocated CU (colCU), or the like, and the reference picture including the temporal neighboring block may also be called a collocated picture (colPic). For example, the inter predictor 121 may configure a motion information candidate list based on the neighboring blocks, and generate information indicating what candidate is used to derive the motion vector and/or the reference picture index of the current block. The inter prediction may be performed based on various prediction modes, and for example, in the case of a skip mode and a merge mode, the inter predictor 121 may use the motion information of the neighboring block as the motion information of the current block. In the case of the skip mode, the residual signal may not be transmitted unlike the merge mode. A motion vector prediction (MVP) mode may indicate the motion vector of the current block by using the motion vector of the neighboring block as a motion vector predictor and by signaling a motion vector difference.

The predictor 120 may generate a predicted signal based on various prediction methods to be described later. For example, the predictor may not only apply the intra prediction or the inter prediction for predicting one block, but also simultaneously apply the intra prediction and the inter prediction. This may be called a combined inter and intra prediction (CIIP). Further, the predictor may be based on an intra block copy (IBC) prediction mode or a palette mode in order to perform prediction on a block. The IBC prediction mode or palette mode may be used for content image/video coding of a game or the like, such as screen content coding (SCC). The IBC basically performs prediction in a current picture, but it may be performed similarly to inter prediction in that it derives a reference block in a current picture. That is, the IBC may use at least one of inter prediction techniques described in this document. The palette mode may be regarded as an example of intra coding or intra prediction. When the palette mode is applied, a sample value in a picture may be signaled based on information on a palette index and a palette table.

The predicted signal generated through the predictor (including the inter predictor 121 and/or the intra predictor 122) may be used to generate a reconstructed signal or used to generate a residual signal. The transformer 132 may generate transform coefficients by applying the transform technique to the residual signal. For example, the transform technique may include at least one of a discrete cosine transform (DCT), a discrete sine transform (DST), a Karhunen-Loève transform (KLT), a graph-based transform (GBT), or a conditionally non-linear transform (CNT). Here, when the relationship information between pixels is illustrated as a graph, the GBT means the transform obtained from the graph. The CNT means the transform which is acquired based on a predicted signal generated by using all previously reconstructed pixels. In addition, the transform process may also be applied to a pixel block having the same size of the square, and may also be applied to the block having a variable size rather than the square.

The quantizer 133 may quantize the transform coefficients to transmit the quantized transform coefficients to the entropy encoder 140, and the entropy encoder 140 may encode the quantized signal (information about the quantized transform coefficients) to output the encoded quantized signal in the form of a bitstream. The information about the quantized transform coefficients may be called residual information. The quantizer 133 may rearrange the quantized transform coefficients having a block form in a one-dimensional vector form based on a coefficient scan order, and may also generate the information about the quantized transform coefficients based on the quantized transform coefficients of the one dimensional vector form. The entropy encoder 140 may perform various encoding methods, for example, such as an exponential Golomb coding, a context-adaptive variable length coding (CAVLC), and a context-adaptive binary arithmetic coding (CABAC). The entropy encoder 140 may also encode information (e.g., values of syntax elements and the like) necessary for video/image reconstruction together or separately other than the quantized transform coefficients. The encoded information (e.g., encoded video/image information) may be transmitted or stored in units of network abstraction layer (NAL) unit in the form of a bitstream. The video/image information may further include information about various parameter sets such as an adaptation parameter set (APS), a picture parameter set (PPS), a sequence parameter set (SPS), or a video parameter set (VPS). In addition, the video/image information may further include general constraint information. In this document, syntax elements and/or information transferred/signaled from the encoding apparatus to the decoding apparatus may be included in video/image information. The video/image information may be included in the bitstream by being encoded through the aforementioned encoding procedure. The bitstream may be transmitted through a network, or may be stored in a digital storage medium. Herein, the network may include a broadcasting network and/or a communication network, or the like, and the digital storage medium may include various storage media such as USB, SD, CD, DVD, Blue-ray, HDD, and SSD. A transmitter (not shown) for transmitting the signal output from the entropy encoder 140 and/or a storage (not shown) for storing the signal may be configured as the internal/external elements of the encoding apparatus 100, or the transmitter may also be included in the entropy encoder 140.

The quantized transform coefficients output from the quantizer 133 may be used to generate a predicted signal. For example, the dequantizer 134 and the inverse transformer 135 may apply dequantization and inverse transform to the quantized transform coefficients, so as to restore the residual signal (residual block or residual samples). The adder 150 may add the reconstructed residual signal to the predicted signal output from the inter predictor 121 or the intra predictor 122, so as to generate the reconstructed signal (reconstructed picture, reconstructed block, reconstructed sample array). As in the case where the skip mode is applied, if there is no residual for the block to be processed, the predicted block may be used as the reconstructed block. The adder 150 may be called a reconstructor or a reconstructed block generator. The generated reconstructed signal may be used for the intra prediction of the next block to be processed within the current picture, and as described later, also used for the inter prediction of the next picture through filtering.

Meanwhile, luma mapping with chroma scaling (LMCS) may also be applied in a picture encoding and/or reconstruction process.

The filter 160 may apply filtering to the reconstructed signal, thereby improving subjective/objective image qualities. For example, the filter 160 may apply various filtering methods to the reconstructed picture to generate a modified reconstructed picture, and store the modified reconstructed picture in the memory 170, specifically, the DPB of the memory 170. Various filtering methods may include, for example, a deblocking filtering, a sample adaptive offset, an adaptive loop filter, a bilateral filter, and the like. The filter 160 may generate various filtering-related information to transfer the generated information to the entropy encoder 140, as described later in the description of each filtering method. The filtering-related information may be encoded by the entropy encoder 140 and may be output in the form of a bitstream.

The modified reconstructed picture transmitted to the memory 170 may be used as the reference picture in the inter predictor 121. If the inter prediction is applied by the inter predictor, the encoding apparatus may avoid the prediction mismatch between the encoding apparatus 100 and the decoding apparatus, and may also improve coding efficiency.

The DPB of the memory 170 may store the modified reconstructed picture to be used as the reference picture in the inter predictor 121. The memory 170 may store motion information of the block in which the motion information within the current picture is derived (or encoded) and/or motion information of the blocks within the previously reconstructed picture. The stored motion information may be transferred to the inter predictor 121 to be utilized as motion information of the spatial neighboring block or motion information of the temporal neighboring block. The memory 170 may store the reconstructed samples of the reconstructed blocks within the current picture, and transfer the reconstructed samples to the intra predictor 122.

Figure 2:
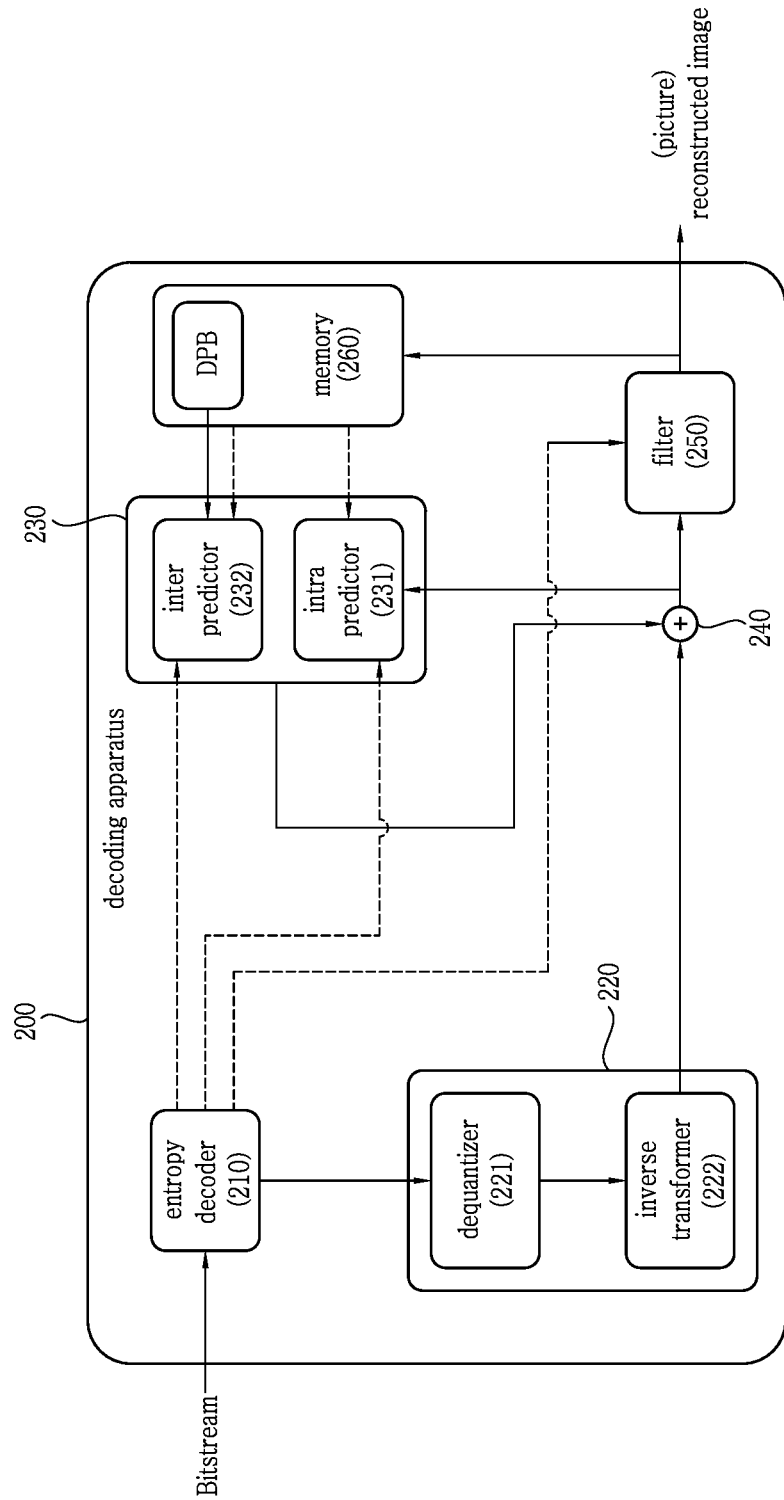
FIG. 2 is a schematic diagram illustrating a configuration of a video/image decoding apparatus to which the present disclosure may be applied.

FIG. 2 is a diagram schematically explaining a configuration of a video/image decoding apparatus to which embodiments of the present disclosure are applicable.

Referring to FIG. 2, a decoding apparatus 200 may include and be configured with an entropy decoder 210, a residual processor 220, a predictor 230, an adder 240, a filter 250, and a memory 260. The predictor 230 may include an inter predictor 232 and an intra predictor 231. The residual processor 220 may include a dequantizer 221 and an inverse transformer 222. The entropy decoder 210, the residual processor 220, the predictor 230, the adder 240, and the filter 250, which have been described above, may be configured by one or more hardware components (e.g., decoder chipsets or processors) according to an embodiment. Further, the memory 260 may include a decoded picture buffer (DPB), and may be configured by a digital storage medium. The hardware component may further include the memory 260 as an internal/external component.

When a bitstream including video/image information is input, the decoding apparatus 200 may reconstruct an image in response to a process in which the video/image information is processed in the encoding apparatus illustrated in FIG. 1. For example, the decoding apparatus 200 may derive units/blocks based on block split-related information acquired from the bitstream. The decoding apparatus 200 may perform decoding using the processing unit applied to the encoding apparatus. Therefore, the processing unit for the decoding may be, for example, a coding unit, and the coding unit may be split according to a quad-tree structure, a binary-tree structure, and/or a ternary-tree structure from a CTU or a LCU. One or more transform units may be derived from the coding unit. In addition, the reconstructed image signal decoded and output through the decoding apparatus 200 may be reproduced through a reproducing apparatus.

The decoding apparatus 200 may receive the signal output from the encoding apparatus illustrated in FIG. 1 in the form of a bitstream, and the received signal may be decoded through the entropy decoder 210. For example, the entropy decoder 210 may derive information (e.g., video/image information) necessary for the image reconstruction (or picture reconstruction) by parsing the bitstream. The video/image information may further include information about various parameter sets such as an adaptation parameter set (APS), a picture parameter set (PPS), a sequence parameter set (SPS), and a video parameter set (VPS). In addition, the video/image information may further include general constraint information. The decoding apparatus may decode the picture further based on the information about the parameter set and/or the general constraint information. Syntax elements and/or information to be signaled/received, which will be described later in this document, may be decoded through the decoding procedure and acquired from the bitstream. For example, the entropy decoder 210 may decode information within the bitstream based on a coding method such as an exponential Golomb coding, a CAVLC, or a CABAC, and output a value of the syntax element necessary for the image reconstruction, and the quantized values of the residual-related transform coefficient. More specifically, the CABAC entropy decoding method may receive a bin corresponding to each syntax element from the bitstream, determine a context model using syntax element information to be decoded and decoding information of the neighboring block and the block to be decoded or information of the symbol/bin decoded in the previous stage, and generate a symbol corresponding to a value of each syntax element by predicting the probability of generation of the bin according to the determined context model to perform the arithmetic decoding of the bin. At this time, the CABAC entropy decoding method may determine the context model and then update the context model using the information of the decoded symbol/bin for a context model of a next symbol/bin. The information about prediction among the information decoded by the entropy decoder 210 may be provided to the predictor (the inter predictor 232 and the intra predictor 231), and a residual value at which the entropy decoding is performed by the entropy decoder 210, that is, the quantized transform coefficients and the related parameter information may be input to the residual processor 220. The residual processor 220 may derive a residual signal (residual block, residual samples, residual sample array). In addition, the information about filtering among the information decoded by the entropy decoder 210 may be provided to the filter 250. Meanwhile, a receiver (not shown) for receiving the signal output from the encoding apparatus may be further configured as the internal/external element of the decoding apparatus 200, or the receiver may also be a component of the entropy decoder 210. Meanwhile, the decoding apparatus according to the present disclosure may be called a video/image/picture decoding apparatus, and the decoding apparatus may also be classified into an information decoder (video/image/picture information decoder) and a sample decoder (video/image/picture sample decoder). The information decoder may include the entropy decoder 210, and the sample decoder may include at least one of the dequantizer 221, the inverse transformer 222, the adder 240, the filter 250, the memory 260, the inter predictor 232, and the intra predictor 231.

The dequantizer 221 may dequantize the quantized transform coefficients to output the transform coefficients. The dequantizer 221 may rearrange the quantized transform coefficients in a two-dimensional block form. In this case, the rearrangement may be performed based on a coefficient scan order performed by the encoding apparatus. The dequantizer 221 may perform dequantization for the quantized transform coefficients using a quantization parameter (e.g., quantization step size information), and acquire the transform coefficients.

The inverse transformer 222 inversely transforms the transform coefficients to acquire the residual signal (residual block, residual sample array).

The predictor 230 may perform prediction on the current block, and generate a predicted block including the prediction samples of the current block. The predictor may determine whether intra prediction is applied or inter prediction is applied to the current block based on the information about prediction output from the entropy decoder 210, and determine a specific intra/inter prediction mode.

The predictor may generate a predicted signal based on various prediction methods to be described later. For example, the predictor may not only apply the intra prediction or the inter prediction for prediction of one block, but also apply the intra prediction and the inter prediction at the same time. This may be called a combined inter and intra prediction (CIIP). Further, the predictor may be based on an intra block copy (IBC) prediction mode or a palette mode in order to perform prediction on a block. The IBC prediction mode or palette mode may be used for content image/video coding of a game or the like, such as screen content coding (SCC). The IBC basically performs prediction in a current picture, but it may be performed similarly to inter prediction in that it derives a reference block in a current picture. That is, the IBC may use at least one of inter prediction techniques described in this document. The palette mode may be regarded as an example of intra coding or intra prediction. When the palette mode is applied, information on a palette table and a palette index may be signaled by being included in the video/image information.

The intra predictor 231 may predict the current block with reference to the samples within the current picture. The referenced samples may be located neighboring to the current block according to the prediction mode, or may also be located away from the current block. The prediction modes in the intra prediction may include a plurality of non-directional modes and a plurality of directional modes. The intra predictor 231 may also determine the prediction mode applied to the current block using the prediction mode applied to the neighboring block.

The inter predictor 232 may induce the predicted block of the current block based on the reference block (reference sample array) specified by the motion vector on the reference picture. At this time, in order to decrease an amount of motion information transmitted in the inter prediction mode, the motion information may be predicted in units of a block, a sub-block, or a sample based on the correlation of the motion information between the neighboring block and the current block. The motion information may include a motion vector and a reference picture index. The motion information may further include inter prediction direction (L0 prediction, L1 prediction, Bi prediction, or the like) information. In the case of the inter prediction, the neighboring block may include a spatial neighboring block existing within the current picture and a temporal neighboring block existing in the reference picture. For example, the inter predictor 232 may configure a motion information candidate list based on the neighboring blocks, and derive the motion vector and/or the reference picture index of the current block based on received candidate selection information. The inter prediction may be performed based on various prediction modes, and the information about the prediction may include information indicating the mode of the inter prediction of the current block.

The adder 240 may add the acquired residual signal to the predicted signal (predicted block, prediction sample array) output from the predictor (including the inter predictor 232 and/or the intra predictor 231) to generate the reconstructed signal (reconstructed picture, reconstructed block, reconstructed sample array). As in the case where the skip mode is applied, if there is no residual for the block to be processed, the predicted block may be used as the reconstructed block.

The adder 240 may be called a reconstructor or a reconstructed block generator. The generated reconstructed signal may be used for the intra prediction of a next block to be processed within the current picture, and as described later, may also be output through filtering or may also be used for the inter prediction of a next picture.

Meanwhile, luma mapping with chroma scaling (LMCS) may also be applied in the picture decoding process.

The filter 250 may apply filtering to the reconstructed signal, thereby improving the subjective/objective image qualities. For example, the filter 250 may apply various filtering methods to the reconstructed picture to generate a modified reconstructed picture, and transmit the modified reconstructed picture to the memory 260, specifically, the DPB of the memory 260. Various filtering methods may include, for example, a deblocking filtering, a sample adaptive offset, an adaptive loop filter, a bidirectional filter, and the like.

The (modified) reconstructed picture stored in the DPB of the memory 260 may be used as the reference picture in the inter predictor 232. The memory 260 may store motion information of the block in which the motion information within the current picture is derived (decoded) and/or motion information of the blocks within the previously reconstructed picture. The stored motion information may be transferred to the inter predictor 260 so as to be utilized as motion information of the spatial neighboring block or motion information of the temporal neighboring block. The memory 260 may store the reconstructed samples of the reconstructed blocks within the current picture, and transfer the stored reconstructed samples to the intra predictor 231.

In this document, exemplary embodiments described in the filter 160, the inter predictor 121, and the intra predictor 122 of the encoding apparatus 100 may be applied equally to or to correspond to the filter 250, the inter predictor 232, and the intra predictor 231 of the decoding apparatus 200, respectively.

As described above, prediction is performed in order to increase compression efficiency in performing video coding. Through this, a predicted block including prediction samples for a current block, which is a coding target block, may be generated. Here, the predicted block includes prediction samples in a space domain (or pixel domain). The predicted block may be identically derived in the encoding apparatus and the decoding apparatus, and the encoding apparatus may increase image coding efficiency by signaling to the decoding apparatus not original sample value of an original block itself but information on residual (residual information) between the original block and the predicted block. The decoding apparatus may derive a residual block including residual samples based on the residual information, generate a reconstructed block including reconstructed samples by adding the residual block to the predicted block, and generate a reconstructed picture including reconstructed blocks.

The residual information may be generated through transform and quantization procedures. For example, the encoding apparatus may derive a residual block between the original block and the predicted block, derive transform coefficients by performing a transform procedure on residual samples (residual sample array) included in the residual block, and derive quantized transform coefficients by performing a quantization procedure on the transform coefficients, so that it may signal associated residual information to the decoding apparatus (through a bitstream). Here, the residual information may include value information, position information, a transform technique, transform kernel, a quantization parameter or the like of the quantized transform coefficients. The decoding apparatus may perform a quantization/dequantization procedure and derive the residual samples (or residual sample block), based on residual information. The decoding apparatus may generate a reconstructed block based on a predicted block and the residual block. The encoding apparatus may derive a residual block by dequantizing/inverse transforming quantized transform coefficients for reference for inter prediction of a next picture, and may generate a reconstructed picture based on this.

Meanwhile, in the VVC system, there is a signaling mechanism in which a system level entity may know whether a picture is used for a reference picture for a certain picture. Through the information, the system level entity may remove a picture in a certain specific situation. That is, the system level entity may remove a picture marked as unused as a reference for another picture. For example, when network congestion occurs, a media recognition network router may drop the network packet which delivers a coded bit of a picture marked as unused as a reference for another picture.

Table 1 below represents flag information for the contents.

nuh_layer_id is signaled in a NAL unit header and an identifier for dividing a layer to which a VCL NAL unit belongs or a layer to which a non-VCL NAL unit is applied.

Figure 3:
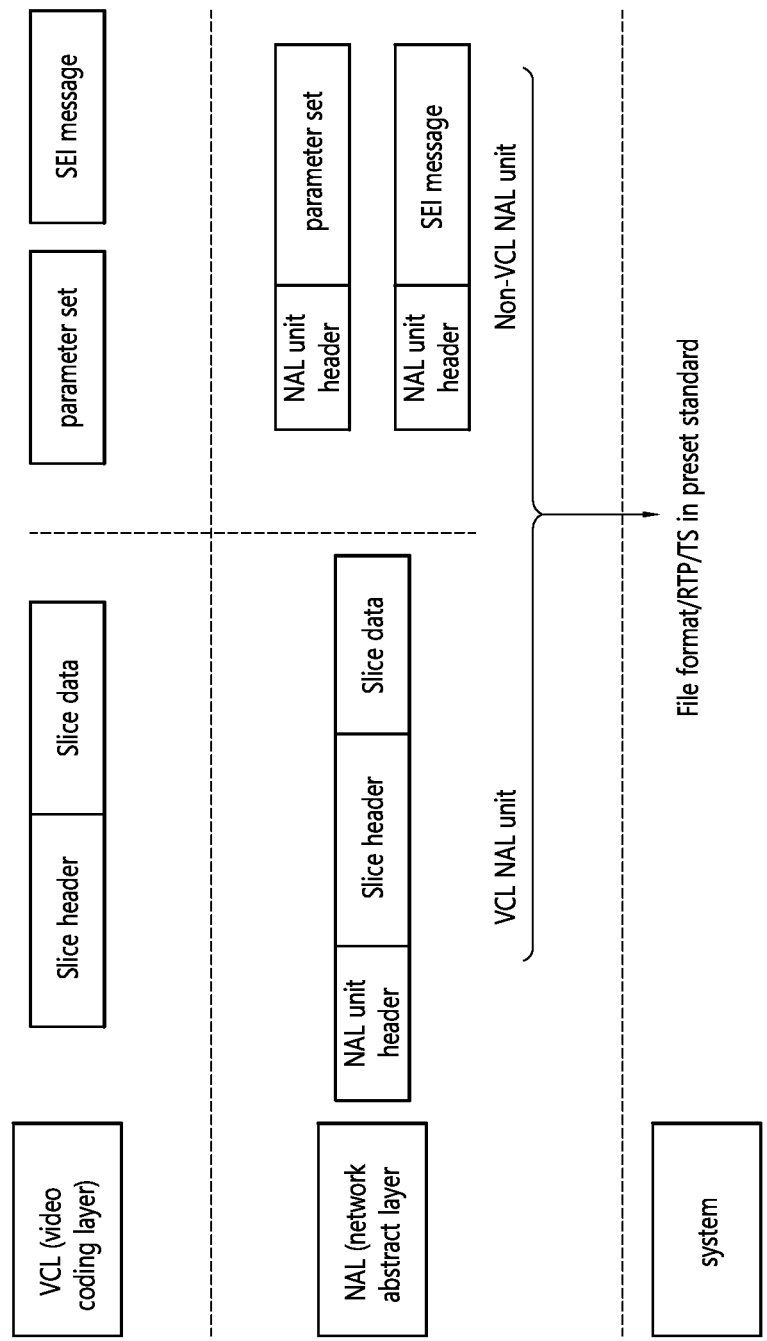
FIG. 3 illustrates an exemplary hierarchical structure for coded image/video.

FIG. 3 illustrates an exemplary hierarchical structure for coded image/video. As shown in FIG. 3, a coded image/video is divided into a video coding layer (VCL) that handles a decoding process of the image/video and the image/video itself, a lower level system that transmits and stores coded information, and a network abstraction layer (NAL) that plays the role of network adaptation and being positioned between the VCL and the lower level system.

The VCL may generate VCL data that includes a compressed image data (slice data) or may generate a supplemental enhancement information (SEI) message which is supplementally required in the decoding processing of a parameter set including information such as a picture parameter set (PPS), a sequence parameter set (SPS), a video parameter set (VPS), and the like or an image.

In the NAL, a NAL unit may be generated by adding header information (NAL unit header) to a Raw Byte Sequence Payload (RBSP) generated in the VCL. In this case, the RBSP is referred to as slice data, a parameter set, an SEI message, and the like, which are generated in the VCL. The NAL unit header may include NAL unit type information which is specified according to RBSP data included in the NAL unit.

As shown in FIG. 3, the NAL unit may be divided into a VCL NAL unit and a non-VCL NAL unit according to the RBSP generated in the VCL. The VCL NAL unit may mean a NAL unit that includes information (slice data) for an image, and the non-VCL NAL unit may mean a NAL unit that includes information (parameter set or SEI message) required to decode an image.

The VCL NAL unit and the non-VCL NAL unit described above may be transmitted through a network by attaching header information according to the data specification of a lower system. For example, the NAL unit may be transformed into a data format of a predetermined specification

TABLE 1

| | Descriptor |
|---|---|
| picture_header_structure( ) { | |
| ... | |
| ph_non_ref_pic_flag | u(1) |
| ... | |
| } | |

...
ph_non_ref_pic_flag equal to 1 specifies the picture associated with the PH is never used as a reference picture. ph_non_ref_pic_flag equal to 0 specifies the picture associated with the PH may or may not be used as a reference picture.
...

As represented in Table 1, when a value of ph_non_ref_pic_flag is 1, this represents that a picture associated with a picture head is not used as a reference picture, and when the value is 0, this represents that a picture associated with a picture head may be used or may not be used as a reference picture.

Meanwhile, currently, the procedure of deriving a POC value of a current picture which is described in the VVC specification is as below.

Through the procedure, a variable PicOrderCntVal that is a POC of a current picture may be derived.

In order for the variable PicOrderCntVal to be derived, image information that is signaled in a higher level syntax is required, which is as described below in detail.

such as H.266/VVC file format, RTP (Real-time Transport Protocol), TS (Transport Stream), and the like and may be transmitted through various types of network.

As described above, for the NAL unit, a NAL unit type may be specified according to an RBSP data structure included in the NAL unit, and the information for the NAL unit type may be stored in a NAL unit header and signaled.

For example, the NAL unit may be classified into a VCL NAL unit type and a non-VCL NAL unit type according to whether the NAL unit includes information (slice data) for an image. The VCL NAL unit type may be classified according to a property and type of a picture included in the VCL NAL unit, and the non-VCL NAL unit type may be classified according to a type of a parameter set.

The NAL unit types described above may have syntax information for the NAL unit type, and the syntax information may be stored in a NAL unit header and signaled. For example, the syntax information may be nal_unit_type, and the NAL unit types may be specified as a nal_unit_type value.

vps_independent_layer_flag[i] is flag information signaled in a video parameter set. When the value is 1, this represents that a layer indexed as i is not used for an inter-layer inter prediction, that is, an inter-layer prediction, and when the value is 0, this represents that a layer indexed as i is used for an inter-layer prediction.

sps_log2_max_pic_order_cnt_lsb_minus4 is a signal which is signaled in a sequence parameter set and represents a value of the variable MaxPicOrderCntLsb used in a decoding process of a POC. The variable MaxPicOrderCntLsb may be specified as $2^{(sps\_log2\_max\_pic\_order\_cnt\_lsb\_minus4+4)}$.

A value of sps_poc_msb_cycle_len_minus1 plus 1 represents a bit length of the syntax element ph_poc_msb_cycle_val.

ph_pic_order_cnt_lsb represents a value of a POC of a current picture divided by the variable MaxPicOrderCntLsb, and a length of ph_pic_order_cnt_lsb is sps_log2_max_pic_order_cnt_lsb_minus4+4 bits. A value of ph_pic_order_cnt_lsb is present in a range of 0 to (MaxPicOrderCntLsb−1).

ph_poc_msb_cycle_present_flag is flag information that represents whether the syntax element ph_poc_msb_cycle_val is present in a picture head. When a value of ph_poc_msb_cycle_present_flag is 1, this represents that the syntax element ph_poc_msb_cycle_val is present in a picture head, and when a value of ph_poc_msb_cycle_present_flag is 0, this represents that the syntax element ph_poc_msb_cycle_val is not present in a picture head. When vps_independent_layer_flag[GeneralLayerIdx[nuh_layer_id]] is 0 and a picture is present in a current AU in a reference layer of a current layer, a value of ph_poc_msb_cycle_present_flag is 0.

ph_poc_msb_cycle_val represents a POC MSB cycle value for a current picture. A length of the syntax element ph_poc_msb_cycle_val is sps_poc_msb_cycle_len_minus1+1 bits.

If vps_independent_layer_flag[GeneralLayerIdx[nuh_layer_id]] is 1 and picture A is present in a current AU in a reference layer of a current layer, the variable PicOrderCntVal is derived as the same value as PicOrderCntVal of picture A, and all VCL NAL units in the current AU need to have the same ph_pic_order_cnt_lsb value.

Otherwise, that is, when the current layer is not used for an inter-layer prediction, the variable PicOrderCntVal of the current picture may be derived as below.

First, when ph_poc_msb_cycle_present_flag is 0 and the current picture is not a CLVSS (coded layer video sequence start), the variable prevPicOrderCntLsb and the variable prevPicOrderCntMsb may be derived as below.

When TemporalId is 0 while the current picture and nuh_layer_id are identical and a previous picture, which is not RASL (random access skipped leading) picture or RADL (random access decodable leading) picture, is set to prevTid0Pic, the variable prevPicOrderCntLsb is the same as ph_pic_order_cnt_lsb of prevTid0Pic, and the variable prevPicOrderCntMsb is the same as PicOrderCntMsb of prevTid0Pic.

Here, TemporalId means a variable derived based on identification information for a temporal layer in a bitstream that supports temporal scalability (or temporal scalable bitstream).

The bitstream that supports temporal scalability (or temporal scalable bitstream) includes information for a temporal layer which is temporally scaled. The information for a temporal layer may be identification information of a temporal layer which is specified according to the temporal scalability of a NAL unit. For example, as the identification information of a temporal layer, temporal_id syntax element may be used, and the temporal_id syntax element may be stored in a NAL unit header in the encoding apparatus and signaled to the decoding apparatus. Hereinafter, in the present disclosure, the temporal layer may be referred to as a sub-layer, a temporal sub-layer, or a temporal scalable layer.

Figure 4:
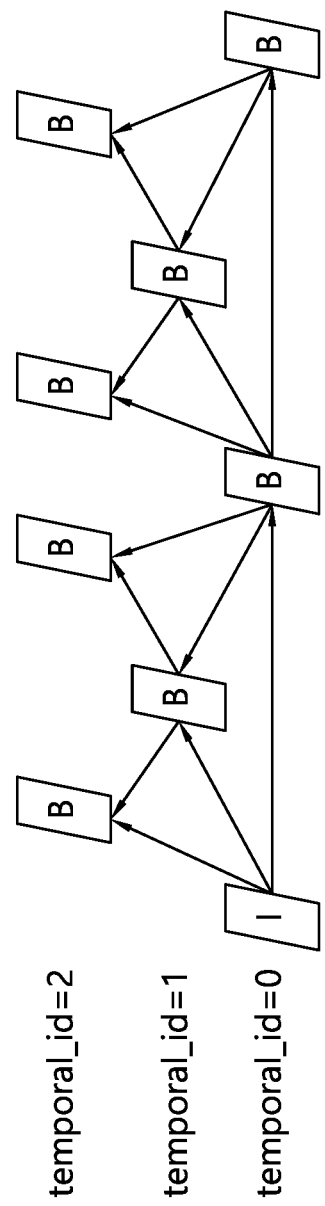
FIG. 4 illustrates a temporal layer structure for a NAL unit in a bitstream supporting a temporal scalability.

FIG. 4 illustrates a temporal layer structure for a NAL unit in a bitstream supporting a temporal scalability.

If the bitstream supports the temporal scalability, NAL units included in a bitstream have identification information (e.g., temporal_id) of the temporal layer. For example, a temporal layer including NAL units of which temporal_id is 0 may provide the lowest temporal scalability, and a temporal layer including NAL units of which temporal_id is 2 may provide the highest temporal scalability.

In FIG. 4, a box indicated by I is an I picture, and a box indicated by B is a B picture. In addition, an arrow mark indicates a reference relation regarding whether one picture refers to another picture.

As shown in FIG. 4, the NAL units of a temporal layer of which temporal_id is 0 are reference pictures which may be referenced by NAL units of a temporal layer of which temporal_id is 0, 1, or 2. The NAL units of the temporal layer of which temporal_id is 1 are reference pictures which may be referenced by NAL units of a temporal layer of which temporal_id is 1 or 2. NAL units of a temporal layer of which temporal id is 2 may be reference pictures which may be referenced by NAL units of the same temporal layer, that is, the temporal layer of which temporal id is 2, or may be non-reference pictures which are not referenced by a different picture.

As shown in FIG. 4, if NAL units of the temporal layer of which temporal_id is 2, that is, the highest temporal layer, are non-reference pictures, the NAL units may be extracted (or removed) from the bitstream without influencing different pictures.

Meanwhile, the variable PicOrderCntMsb for the current layer is derived as below.

If a value of ph_poc_msb_cycle_present_flag is 1, the variable PicOrderCntMsb is equal to a value of ph_poc_msb_cycle_val multiplied by MaxPicOrderCntLsb (ph_poc_msb_cycle_val*MaxPicOrderCntLsb).

Otherwise, that is, when a value of ph_poc_msb_cycle_present_flag is 0, if the current picture is a CVSS picture, the variable PicOrderCntMsb is equal to 0.

If a value of ph_poc_msb_cycle_present_flag is 0 and the current picture is not a CVSS picture, the variable PicOrderCntMsb may be derived based on the following equation.

$$\text{if}((\,ph\_pic\_order\_cnt\_lsb < prevPicOrderCntLsb\,)\,\&\& \quad \text{[Equation 1]}$$
$$((\,prevPicOrderCntLsb - ph\_pic\_order\_cnt\_lsb\,) >=$$
$$(\,MaxPicOrderCntLsb/2\,)))$$

-continued $$PicOrderCntMsb = prevPicOrderCntMsb +$$
$$MaxPicOrderCntLsb \quad (201)$$

else if( ( ph_pic_order_cnt_lsb > prevPicOrderCntLsb ) &&

( ( ph_pic_order_cnt_lsb − prevPicOrderCntLsb ) >

( MaxPicOrderCntLsb / 2 ) ) )

$$PicOrderCntMsb = prevPicOrderCntMsb - MaxPicOrderCntLsb$$

else $$PicOrderCntMsb = prevPicOrderCntMsb$$

Finally, the variable PicOrderCntVal which is the POC value for the current picture is derived as the summation of the preciously derived variables PicOrderCntMsb and ph_pic_order_cnt_lsb.

Here, since all CVSS pictures of which the ph_poc_msb_cycle_val value is not present have the variable PicOrderCntMsb value of 0, PicOrderCntVal is equal to ph_pic_order_cnt_lsb.

PicOrderCntVal value may be in the range of $-2^{31}$ to $2^{31}-1$, and two coded pictures which have the same nuh_layer_id in the one CVS may not have the same PicOrderCntVal value.

In addition, all pictures in specific AU should have the same PicOrderCntVal value.

Meanwhile, in the above-described POC decoding procedure, there is a problem related to a non-referenced picture. In the POC decoding procedure, the inference of PicOrderCntMsb may defer depending on the POC value of a picture designed with prevTid0Pic. Since prevTid0Pic for the current picture should be the same picture in the encoding and decoding processes, the POC value is the same.

However, when prevTid0Pic is determined, it is not considered whether prevTid0Pic is a picture that may be removed by the system entity since a value of ph_non_ref_pic_flag is 1. When the picture which is designated as prevTid0Pic for the current picture is present, since the system was removed by the system, the decoding apparatus may unconsciously use another picture as prevTid0Pic for POC decoding of the current picture. Consequently, the decoding apparatus may derive a wrong POC value.

To solve this problem, the various embodiments may be proposed as follows in the present disclosure. Each of the embodiments may be applied in the image decoding and encoding procedures independently or in combination.

1. The picture selected as prevTid0Pic in the POC decoding procedure may be restricted to a picture of which ph_non_ref_pic_flag is not equal to 1.
2. The ph_non_ref_pic_flag value of the picture of which TemporalId is 0 may be restricted not to be equal to 1.
3. When the CLVS (i.e., coded layer video sequence) has one or more temporal sub-layers, any picture (i.e., TemporalId is 0) in a basic temporal sub-layer may be restricted not to have 1 as a value of ph_non_ref_pic_flag.
4. When the CLVS contains the pictures which are not all intra pictures (i.e., a value of intra_only_constraint_flag is equal to 1), the picture of which TemporalId is 0 may be restricted not to have 1 as a value of ph_non_ref_pic_flag.
5. In the case that the CLVS contains the pictures which are not all intra pictures (i.e., a value of intra_only_constraint_flag is 1) and one or more temporal sub-layers are present in the CLVS, the picture of which TemporalId is 0 may be restricted not to have 1 as a value of ph_non_ref_pic_flag.
6. With respect to two consecutive picture pairs of which TemporalId is 0 and ph_non_ref_pic_flag is 0, it may be restricted such that an absolute POC difference between pictures may be not greater than a half value of MaxPicOrderCntLsb.

In other words, to prevent the POC from being wrongly derived when the non-referenced picture is used in POC decoding procedure, in the present disclosure, the non-referenced picture of which TemporalId is 0 may not be used in the POC decoding procedure, and additionally, the difference of the POC values between two consecutive pictures of which TemporalId is 0 and ph_non_ref_pic_flag is 0 may be restricted to be not greater than a half of MaxPicOrderCntLsb.

Figure 5:
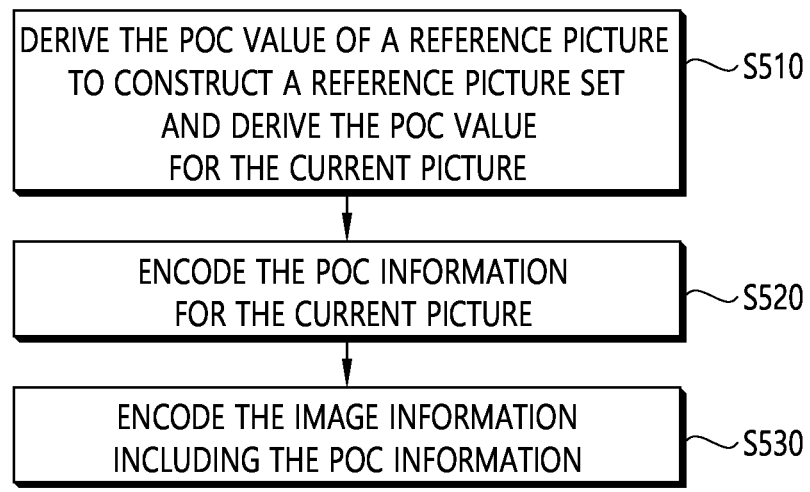
FIG. 5 is a diagram for describing an encoding method of image information performed by the encoding apparatus according to an example of the present disclosure.
Figure 6:
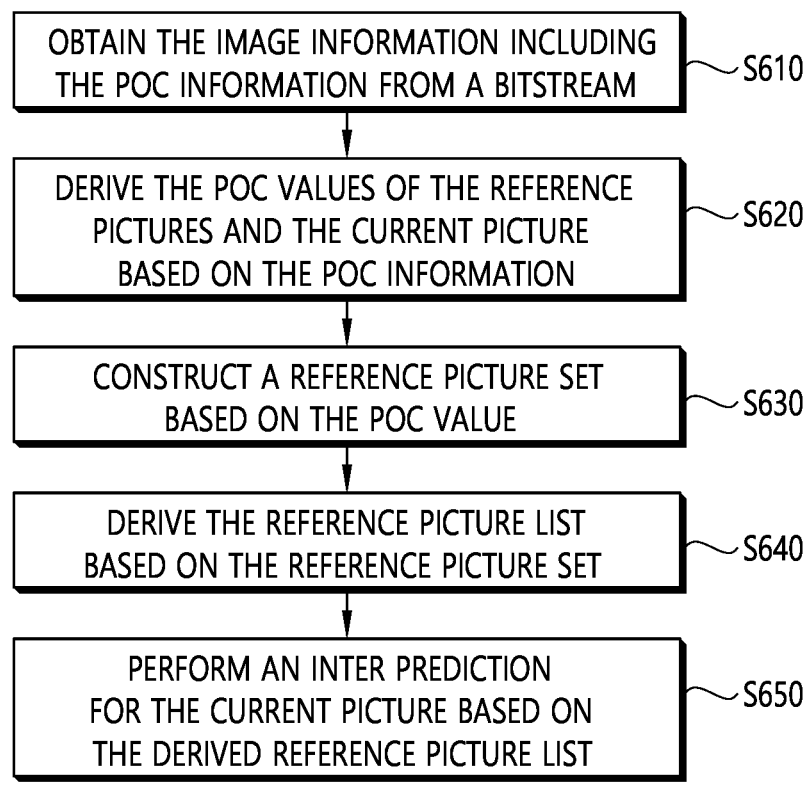
FIG. 6 is a diagram for describing a decoding method of image information performed by the decoding apparatus according to an example of the present disclosure.

FIG. 5 is a diagram for describing an encoding method of image information performed by the encoding apparatus according to an example of the present disclosure, and FIG. 6 is a diagram for describing a decoding method of image information performed by the decoding apparatus according to an example of the present disclosure.

The encoding apparatus may derive the POC value of a reference picture to construct a reference picture set and may derive the POC value for the current picture (step S510).

The encoding apparatus may encode the POC information for the derived current picture (step S520) and may encode the image information including the POC information (step S530).

In response to the operation performed in the encoding apparatus, the decoding apparatus may obtain the image information including the POC information from a bitstream (step S610) and may derive the POC values of the reference pictures and the current picture based on the POC information (step S620).

The reference picture set may be constructed based on the derived POC value (step S630), and the reference picture list may be derived based on the reference picture set (step S640).

Based on the derived reference picture list, an inter prediction for the current picture may be performed (step S650).

The image information such as the POC information may be included in the HLS (High level syntax). The POC information may include the information and the syntax element related to the POC, and the POC information may include the POC information related to the current picture and/or the POC information related to the reference pictures. The POC information may include at least one of ph_non_reference_picture_flag, ph_non_reference_picture_flag, ph_poc_msb_cycle_present_flag, and/or ph_poc_msb_cycle_val.

Either one of the reference picture set or the reference picture list derived as shown in FIG. 5 and FIG. 6 may be omitted. For example, step S640 which derives the reference picture list may be omitted, an inter prediction may be performed based on the reference picture set.

Alternatively, according to another example, the reference picture list may be derived based on the POC value instead of step S630 for deriving the reference picture set and step S630 for derive the reference picture list. For example, the POC value of the i-th reference picture may be derived based on the POC difference value indicated by the POC information related to the reference picture. In this case, when i is 0, the POC information may represent the POC difference between the current picture and the i-th reference picture, and when i is greater than 0, the POC information may represent the POC difference between the i-th reference picture and the (i−1)-th reference picture. The reference picture may include the previous reference picture having a smaller POC value than that of the current picture and/or the subsequent reference picture having a greater POC value than that of the current picture.

Hereinafter, the embodiments proposed in the present disclosure will be described in detail.

Embodiment 1

Table 2 is corresponding to the example in which the second example described above (the ph_non_ref_pic_flag value of a picture of which TemporalId is 0 is restricted not to be equal to 1) is implemented. In Table 2, the part added according to the embodiment based on the current VVC specification is marked with underlines.

TABLE 2

...
ph_non_ref_pic_flag equal to 1 specifies the picture associated with the PH is
  never used as a reference picture. ph_non_ref_pic_flag equal to 0 specifies th
e picture associated with the PH may or may not be used as a reference pictu
re.
It is a constraint of the bitstream conformance that the value of ph_non_ref_pi
c_flag shall not be equal to 1 when TemporalId of the picture associated with
the picture header is equal to 0.
...

Embodiment 2

Table 3 corresponds to the example in which the third example described above (when the CLVS has one or more temporal sub-layers, any picture in a basic temporal sub-layer is restricted not to have 1 as a value of ph_non_ref_pic_flag) is implemented. In Table 3, the part added according to the embodiment based on the current VVC specification is marked with underlines.

TABLE 3

...
ph_non_ref_pic_flag equal to 1 specifies the picture associated with the PH
  is never used as a reference picture. ph_non_ref_pic_flag equal to 0 specifi
es the picture associated with the PH may or may not be used as a referen
ce picture.
It is a constraint of the bitstream conformance that when the current CLVS
contains more than one temporal sub-layer, the value of ph_non_ref_pic_flag
  shall not be equal to 1 when TemporalId of the picture associated with the
  picture header is equal to 0.
alternatively, the above constraint may be expressed as follows:
It is a constraint of the bitstream conformance that when the value of sps_
max_sublayers_minus1 is greater than 0, the value of ph_non_ref_pic_flag s
hall not be equal to 1 when TemporalId of the picture associated with the
picture header is equal to 0.
...

Embodiment 3

Table 4 corresponds to the example in which the fourth example described above (when the CLVS includes pictures which are not all intra pictures, the picture of which TemporalId is 0 is restricted not to have 1 as a value of ph_non_ref_pic_flag) is implemented. In Table 4, the part added according to the embodiment based on the current VVC specification is marked with underlines.

TABLE 4

...
ph_non_ref_pic_flag equal to 1 specifies the picture associated with the PH is never used as a reference picture. ph_non_ref_pic_flag equal to 0 specifies the picture associated with the PH may or may not be used as a reference picture.
It is a constraint of the bitstream conformance that when the value of intra_only_constraint_flag is equal to 0, the value of ph_non_ref_pic_flag shall not be equal to 1 when TemporalId of the picture associated with the picture header is equal to 0.
...

Embodiment 4

Table 5 corresponds to the example in which the fifth example described above (in the case that the CLVS contains the pictures which are not all intra pictures (i.e., a value of intra_only_constraint_flag is 1) and one or more temporal sub-layers are present in the CLVS, the picture of which TemporalId is 0 is restricted not to have 1 as a value of ph_non_ref_pic_flag) is implemented. In Table 5, the part added according to the embodiment based on the current VVC specification is marked with underlines.

TABLE 5

...
ph_non_ref_pic_flag equal to 1 specifies the picture associated with the PH is never used as a reference picture. ph_non_ref_pic_flag equal to 0 specifies the picture associated with the PH may or may not be used as a reference picture.
It is a constraint of the bitstream conformance that when the current CLVS contains more than one temporal sub-layer and the value of intra_only_constraint_flag is equal to 0, the value of ph_non_ref_pic_flag shall not be equal to 1 when TemporalId of the picture associated with the picture header is equal to 0.
...

Embodiment 5

Table 6 corresponds to the example in which the sixth example described above (with respect to two consecutive picture pairs of which TemporalId is 0 and ph_non_ref_pic_flag is 0, the absolute POC difference between pictures is restricted not to be greater than a half of a value of MaxPicOrderCntLsb) is implemented. In Table 6, the part added according to the embodiment based on the current VVC specification is marked with underlines.

TABLE 6

...
nuh_temporal_id_plus1 minus 1 specifies a temporal identifier for the NAL unit. The value of nuh_temporal_id_plus1 shall not be equal to 0.
The variable TemporalId is derived as follows:
    TemporalId = nuh_temporal_id_plus1 − 1    (36)
When nal_unit_type is in the range of IDR_W_RADL to RSV_IRAP_12, inclusive, TemporalId shall be equal to 0.
When nal_unit_type is equal to STSA_NUT and vps_independent_layer_flag[ GeneralLayerIdx[ nuh_layer_id ] ] is equal to 1, TemporalId shall not be equal to 0.
The value of TemporalId shall be the same for all VCL NAL units of an AU. The value of TemporalId of a coded picture, a PU, or an AU is the value of the TemporalId of the VCL NAL units of the coded picture, PU, or AU. The value of TemporalId of a sublayer representation is the greatest value of TemporalId of all VCL NAL units in the sublayer representation.
The value of TemporalId for non-VCL NAL units is constrained as follows:
- If nal_unit_type is equal to DCI_NUT, VPS_NUT, or SPS_NUT, TemporalId shall be equal to 0 and the TemporalId of the AU containing the NAL unit shall be equal to 0.
- Otherwise, if nal_unit_type is equal to PH_NUT, TemporalId shall be equal to the TemporalId of the PU containing the NAL unit.
- Otherwise, if nal_unit_type is equal to EOS_NUT or EOB_NUT, TemporalId shall be equal to 0.

TABLE 6-continued

- Otherwise, if nal_unit_type is equal to AUD_NUT, FD_NUT, PREFIX_SEI_NUT, or SUFFIX_SEI_NUT, TemporalId shall be equal to the TemporalId of the AU containing the NAL unit.
- Otherwise, when nal_unit_type is equal to PPS_NUT, PREFIX_APS_NUT, or SUFFIX_APS_NUT, TemporalId shall be greater than or equal to the TemporalId of the PU containing the NAL unit.
  > NOTE 7 — When the NAL unit is a non-VCL NAL unit, the value of TemporalId is equal to the minimum value of the TemporalId values of all AUs to which the non-VCL NAL unit applies. When nal unit type is equal to PPS_NUT, PREFIX_APS_NUT, or SUFFIX_APS_NUT, TemporalId may be greater than or equal to the TemporalId of the containing AU, as all PPSs and APSs may be included in the beginning of the bitstream (e.g., when they are transported out-of-band, and the receiver places them at the beginning of the bitstream), wherein the first coded picture has TemporalId equal to 0.

Let picture picA and picB be two pictures with TemporalId equal to 0, it is a constraint of conformance bitstream that DiffPicOrderCnt( picB, picA ) shall not be greater than MaxPicOrderCntLsb / 2 when all of the following conditions are satisfied:
- The values of nuh_layer_id of picA and picB are the same.
- picA and picB are not RADL picture or RASL picture.
- The value of ph_non_reference_picture_flag of picA and picB are both equal to 0.
- picB is the first picture with TemporalId equal to 0 that follows picA in output order.

Alternatively, the last condition can be expressed as follows:
- picB follows picA in outuput order.
- There shall be no picture with TemporalId equal to 0, have the same nuh_layer_id as nuh_layer_id of picA, not a RADL or RASL picture, that follows picA in output order but procedes picB in output order.
...

The following drawings are made to describe the specific example of the present disclosure. Since the name of the specific device and the name of the specific signal/message/field shown in the drawings are exemplarily presented, the technical feature of the present disclosure is not limited by the specific name used in the following drawings.

Figure 7:
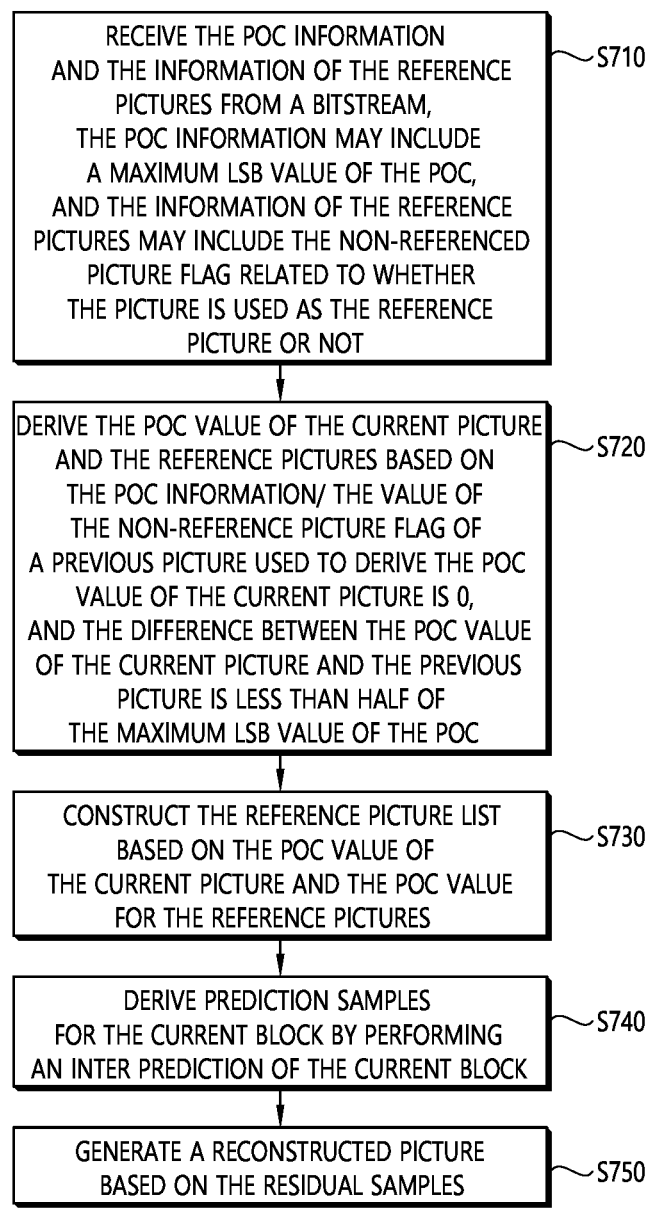
FIG. 7 is a flowchart illustrating an operation of the video decoding apparatus according to an embodiment of the present disclosure.

FIG. 7 is a flowchart illustrating an operation of the video decoding apparatus according to an embodiment of the present disclosure.

Each step disclosed in FIG. 7 is based on some of the contents described above in FIG. 3 to FIG. 6. Accordingly, the detailed contents overlapping with the contents described above in FIG. 2 to FIG. 6 will be omitted or briefly described.

The decoding apparatus 200 according to an embodiment may receive the POC information and the information of the reference pictures from a bitstream, the POC information may include a maximum LSB value of the POC, and the information of the reference pictures may include the non-referenced picture flag related to whether the picture is used as the reference picture or not (step S710).

The non-referenced picture flag may be ph_non_ref_pic_flag represented in Table 1, and when the value is 1, this represents that the picture related to the picture header may not be used as the reference picture, and when the value is 0, this represents that the picture related to the picture header may be or may not be used as the reference picture. That is, the picture of which the non-referenced picture flag value is 0 is not used as the reference picture of another picture. In other words, the non-referenced picture flag value of the picture used as the reference picture of another picture is 1.

The received POC information may include vps_independent_layer_flag, sps_log2_max_pic_order_cnt_lsb_minus4, sps_poc_msb_cycle_len_minus1, ph_pic_order_cnt_lsb, ph_poc_msb_cycle_present_flag, ph_poc_msb_cycle_val, and the like, and these types of information may be signaled in the picture header or the sequence parameter set. The description of the signaled syntax information is the same as described above.

The decoding apparatus may derive the POC value of the current picture and the reference pictures based on the POC information for an inter-prediction of the current picture and for a generation of the reference picture list (step S720).

The variable PicOrderCntVal indicating the POC value of the current picture may be derived as the sum of the variable PicOrderCntMsb (variable POCMsb) indicating the MSB value of the current picture and the ph_pic_order_cnt_lsb (POC LSB information) value indicating the LSB of the current picture signaled in the picture header (variable PicOrderCntMsb+ph_pic_order_cnt_lsb).

In the case that the vps_independent_layer_flag value of the current picture is 0 and the current layer is used as the reference picture, the current picture has the same POC value as the picture included in the current AU in the reference layer.

Otherwise, in the case that the current layer is not used in the inter-layer prediction, the variable PicOrderCntVal of the current picture may be derived based on the POC MSB cycle value (ph_poc_msb_cycle_val) signaled based on the ph_poc_msb_cycle_present_flag value (cycle present flag) and the cycle present flag value. In this case, different derivation processes may be applied depending on the presence of the cycle present flag value and whether the current picture is the CLVSS (coded layer video sequence start) picture.

The first case corresponds to the case in which ph_poc_msb_cycle_present_flag is 0 and the current picture is not the CLVSS picture. For the POC derivation, the variable prevPicOrderCntLsb and the variable prevPicOrderCntMsb for the previous picture may be derived, and the variable POCMsb for the current picture may be derived based on the variable POCMsb of previous picture.

When the current picture and nuh_layer_id are the same while TemporalId is 0, and the previous picture other than the RASL (random access skipped leading) picture or the RADL (random access decodable leading) picture is set to prevTid0Pic, the variable prevPicOrderCntLsb is derived to be the same as ph_pic_order_cnt_lsb of prevTid0Pic, and the variable prevPicOrderCntMsb is derived to be the same as PicOrderCntMsb of prevTid0Pic.

In this case, a value of the non-referenced picture flag of the previous picture used to derive the POC value of the current picture is 0, and there may be a restriction that the difference of the POC value between the current picture and the previous picture is less than a half of the maximum LSB value of the POC.

In addition, the layer IDs for the current picture and the previous picture are the same, and the temporal ID (TemporalId) derived from the identification information of the temporal layer for the previous picture is 0. The previous picture for the POC derivation of the current picture is not the PASL picture nor the RADL picture.

Thereafter, the variable PicOrderCntVal may be derived as represented in Equation 1 according to ph_pic_order_cnt_lsb of the current picture and the size of the variable prevPicOrderCntLsb for the previous picture.

The second case corresponds to the case in which ph_poc_msb_cycle_present_flag is 0 and the current picture is the CLVSS picture. Since the PicOrderCntMsb value is 0, the variable PicOrderCntVal may be derived as the ph_pic_order_cnt_lsb value.

The third case corresponds to the case in which the ph_poc_msb_cycle_present_flag value is 1, and in this case, the variable PicOrderCntMsb is derived as a value obtained by multiplying ph_poc_msb_cycle_val by MaxPicOrderCntLsb (ph_poc_msb_cycle_val*MaxPicOrderCntLsb). Consequently, the variable PicOrderCntVal is derived as the sum of the derived variable PicOrderCntMsb and the signaled ph_pic_order_cnt_lsb value.

The decoding apparatus may construct the reference picture list based on the POC value of the current picture and the POC value for the reference pictures (step S730) and may derive prediction samples for the current block by performing an inter prediction of the current block (step S740).

Furthermore, the decoding apparatus 200 may decode information for quantized transform coefficients for the current block from a bitstream and may derive the quantized transform coefficients for a target block based in the information for the quantized transform coefficients for the current block. The information for the quantized transform coefficients for the target block may be included in a sequence parameter set (SPS) or a slice header and may include at least one of information on whether a reduced transform (RST) is applied, information on a reduced factor, information of a minimum transform size to which the RST is applied, information of a maximum transform size to which the RST is applied, information of a reduced inverse transform size, and information of a transform index indicating any one of transform kernel matrices included in a transform set.

The decoding apparatus 200 may derive residual information for the current block, that is, transform coefficients by performing the dequantization for the quantized transform coefficients and may array the derived transform coefficients in a predetermined scanning order.

The transform coefficient derived based on the residual information may be the dequantized transform coefficient or the quantized transform coefficient as described above. That is, the transform coefficient may be the data that may check non-zero data in the current block without regard to whether the quantization is performed therefor.

The decoding apparatus may derive residual samples by applying the inverse transform to the quantized transform coefficient.

Thereafter, the decoding apparatus may generate a reconstructed picture based on the residual samples and the prediction samples (step S750).

The following drawings are made to describe the specific example of the present disclosure. Since the name of the specific device and the name of the specific signal/message/field shown in the drawings are exemplarily presented, the technical feature of the present disclosure is not limited by the specific name used in the following drawings.

Figure 8:
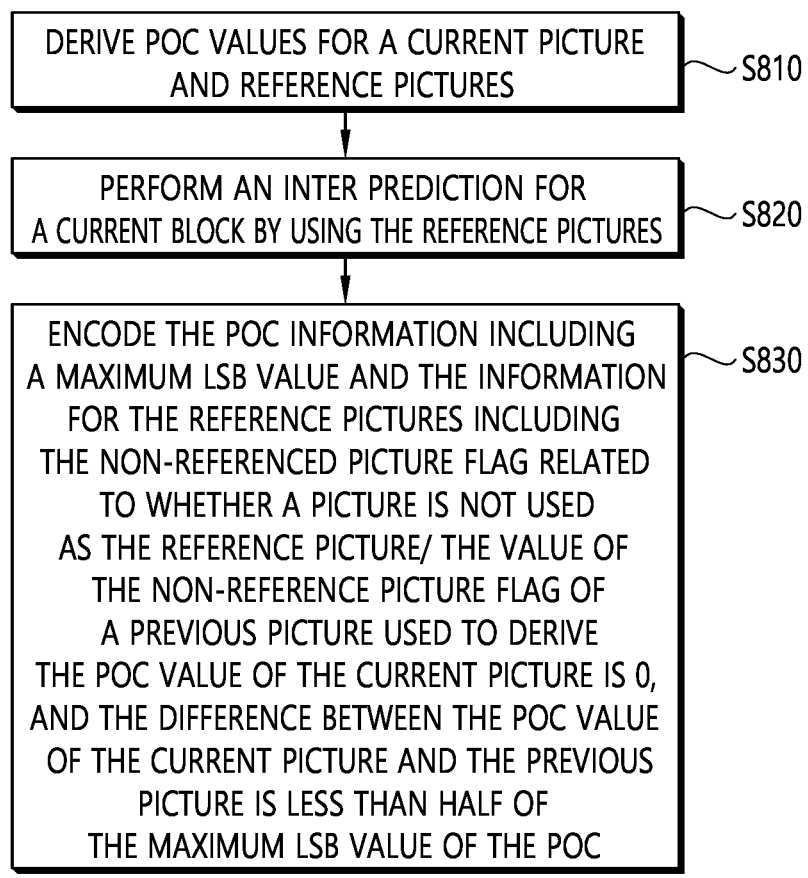
FIG. 8 is a flowchart illustrating an operation of the video encoding apparatus according to an embodiment of the present disclosure.

FIG. 8 is a flowchart illustrating an operation of the video encoding apparatus according to an embodiment of the present disclosure.

Each step disclosed in FIG. 8 is based on some of the contents described above in FIG. 3 to FIG. 6. Accordingly, the detailed contents overlapping with the contents described above in FIG. 2 to FIG. 6 will be omitted or briefly described.

The encoding apparatus 100 according to an embodiment may derive POC values for a current picture and reference pictures (step S810) and may perform an inter prediction for a current block by using the derived POC value and the reference picture (step S820).

The encoding apparatus may encode and output the POC information including a maximum LSB value and the information for the reference pictures including the non-referenced picture flag related to whether a picture is not used as the reference picture. A value of the non-referenced picture flag of the previous picture used to derive the POC value of the current picture may be 0, and the difference of the POC values between the current picture and the previous picture may be constructed to be smaller than a half of the maximum LSB value (step S830).

The POC information for the current picture, the method for deriving the POC of the current picture, the restriction for the previous picture, and the restriction condition for the POC value of the previous picture are substantially the same as the contents for the decoding apparatus described with reference to FIG. 7, and the overlapped description is omitted.

The encoding apparatus may derive residual samples for the current block based on prediction samples and may generate information for residual through the transform. The residual information may include the transform related information/syntax element described above. The encoding apparatus may encode the image/video information including the residual information to output the image/video information in a bitstream format.

More specifically, the encoding apparatus may generate information about the quantized transform coefficients and encode the information about the generated quantized transform coefficients.

In the present disclosure, at least one of quantization/dequantization and/or transform/inverse transform may be omitted. When quantization/dequantization is omitted, a quantized transform coefficient may be referred to as a transform coefficient. When transform/inverse transform is omitted, the transform coefficient may be referred to as a coefficient or a residual coefficient, or may still be referred to as a transform coefficient for consistency of expression.

In the above-described embodiments, the methods are explained on the basis of flowcharts by means of a series of steps or blocks, but the present disclosure is not limited to the order of steps, and a certain step may be performed in order or step different from that described above, or concurrently with another step. Further, it may be understood by a person having ordinary skill in the art that the steps shown in a flowchart are not exclusive, and that another step may be incorporated or one or more steps of the flowchart may be removed without affecting the scope of the present disclosure.

The above-described methods according to the present disclosure may be implemented as a software form, and an encoding apparatus and/or decoding apparatus according to the disclosure may be included in a device for image processing, such as, a TV, a computer, a smartphone, a set-top box, a display device or the like.

When embodiments in the present disclosure are embodied by software, the above-described methods may be embodied as modules (processes, functions or the like) to perform the above-described functions. The modules may be stored in a memory and may be executed by a processor. The memory may be inside or outside the processor and may be connected to the processor in various well-known manners. The processor may include an application-specific integrated circuit (ASIC), other chipset, logic circuit, and/or a data processing device. The memory may include a read-only memory (ROM), a random access memory (RAM), a flash memory, a memory card, a storage medium, and/or other storage device. That is, embodiments described in the present disclosure may be embodied and performed on a processor, a microprocessor, a controller or a chip. For example, function units shown in each drawing may be embodied and performed on a computer, a processor, a microprocessor, a controller or a chip.

Further, the decoding apparatus and the encoding apparatus to which the present disclosure is applied, may be included in a multimedia broadcasting transceiver, a mobile communication terminal, a home cinema video device, a digital cinema video device, a surveillance camera, a video chat device, a real time communication device such as video communication, a mobile streaming device, a storage medium, a camcorder, a video on demand (VoD) service providing device, an over the top (OTT) video device, an Internet streaming service providing device, a three-dimensional (3D) video device, a video telephony video device, and a medical video device, and may be used to process a video signal or a data signal. For example, the over the top (OTT) video device may include a game console, a Blu-ray player, an Internet access TV, a Home theater system, a smartphone, a Tablet PC, a digital video recorder (DVR) and the like.

In addition, the processing method to which the present disclosure is applied, may be produced in the form of a program executed by a computer, and be stored in a computer-readable recording medium. Multimedia data having a data structure according to the present disclosure may also be stored in a computer-readable recording medium. The computer-readable recording medium includes all kinds of storage devices and distributed storage devices in which computer-readable data are stored. The computer-readable recording medium may include, for example, a Blu-ray Disc (BD), a universal serial bus (USB), a ROM, a PROM, an EPROM, an EEPROM, a RAM, a CD-ROM, a magnetic tape, a floppy disk, and an optical data storage device. Further, the computer-readable recording medium includes media embodied in the form of a carrier wave (for example, transmission over the Internet). In addition, a bitstream generated by the encoding method may be stored in a computer-readable recording medium or transmitted through a wired or wireless communication network. Additionally, the embodiments of the present disclosure may be embodied as a computer program product by program codes, and the program codes may be executed on a computer by the embodiments of the present disclosure. The program codes may be stored on a computer-readable carrier.

Figure 9:
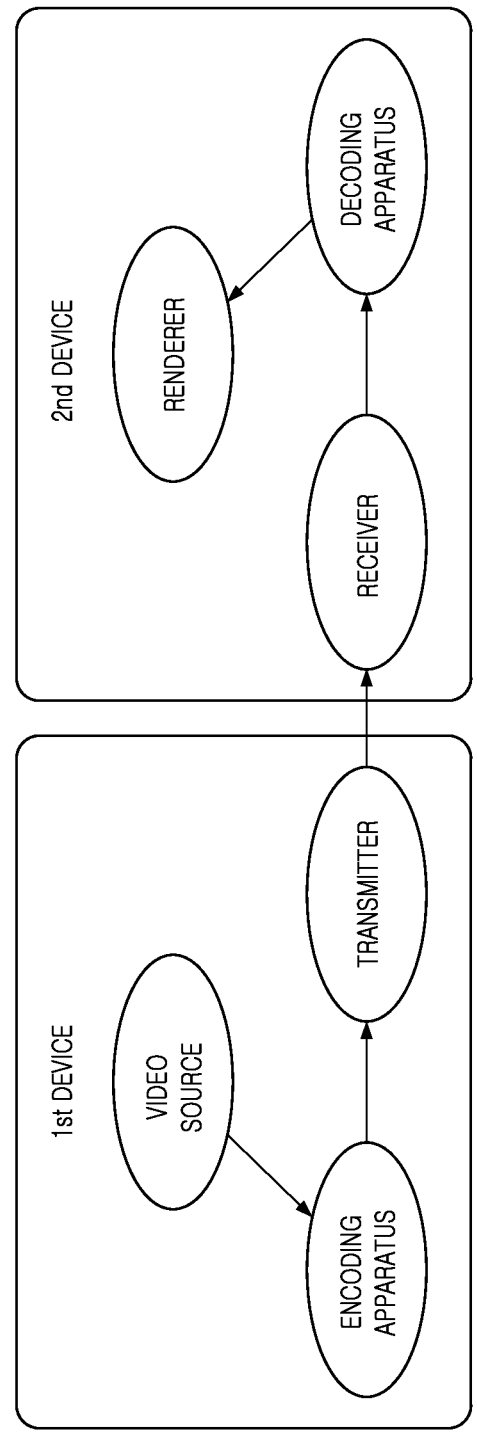
FIG. 9 schematically illustrates an example of a video/image coding system to which the present disclosure is applicable.

FIG. 9 schematically illustrates an example of a video/image coding system to which the present disclosure is applicable.

Referring to FIG. 9, the video/image coding system may include a first device (source device) and a second device (receive device). The source device may deliver encoded video/image information or data in the form of a file or streaming to the receive device via a digital storage medium or network.

The source device may include a video source, an encoding apparatus, and a transmitter. The receive device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may obtain a video/image through a process of capturing, synthesizing, or generating a video/image. The video source may include a video/image capture device and/or a video/image generating device. The video/image capture device may include, for example, one or more cameras, video/image archives including previously captured video/images, or the like. The video/image generating device may include, for example, a computer, a tablet and a smartphone, and may (electronically) generate a video/image. For example, a virtual video/image may be generated through a computer or the like. In this case, the video/image capturing process may be replaced by a process of generating related data.

The encoding apparatus may encode an input video/image. The encoding apparatus may perform a series of procedures such as prediction, transform, and quantization for compression and coding efficiency. The encoded data (encoded video/image information) may be output in the form of a bitstream.

The transmitter may transmit the encoded video/image information or data output in the form of a bitstream to the receiver of the receive device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format, and may include an element for transmission through a broadcast/communication network. The receiver may receive/extract the bitstream and transmit the received/extracted bitstream to the decoding apparatus.

The decoding apparatus may decode a video/image by performing a series of procedures such as dequantization, inverse transform, prediction, and the like corresponding to the operation of the encoding apparatus.

The renderer may render the decoded video/image. The rendered video/image may be displayed through the display.

Figure 10:
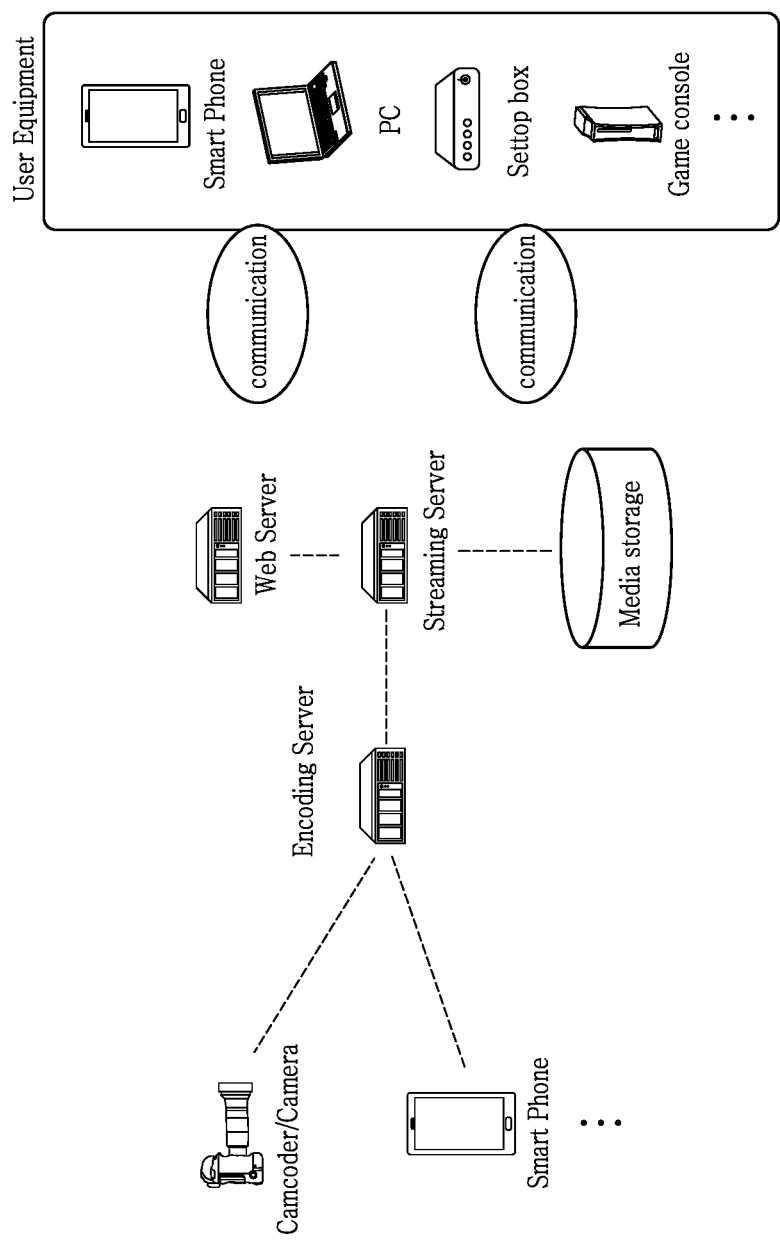
FIG. 10 illustrates the structure of a content streaming system to which the present disclosure is applied.

FIG. 10 illustrates the structure of a content streaming system to which the present disclosure is applied.

Further, the contents streaming system to which the present disclosure is applied may largely include an encoding server, a streaming server, a web server, a media storage, a user equipment, and a multimedia input device.

The encoding server functions to compress to digital data the contents input from the multimedia input devices, such as the smart phone, the camera, the camcorder and the like, to generate a bitstream, and to transmit it to the streaming server. As another example, in a case where the multimedia input device, such as, the smart phone, the camera, the camcoder or the like, directly generates a bitstream, the encoding server may be omitted. The bitstream may be generated by an encoding method or a bitstream generation method to which the present disclosure is applied. And the streaming server may store the bitstream temporarily during a process to transmit or receive the bitstream.

The streaming server transmits multimedia data to the user equipment on the basis of a user's request through the web server, which functions as an instrument that informs a user of what service there is. When the user requests a service which the user wants, the web server transfers the request to the streaming server, and the streaming server transmits multimedia data to the user. In this regard, the contents streaming system may include a separate control server, and in this case, the control server functions to control commands/responses between respective equipments in the content streaming system.

The streaming server may receive contents from the media storage and/or the encoding server. For example, in a case the contents are received from the encoding server, the contents may be received in real time. In this case, the streaming server may store the bitstream for a predetermined period of time to provide the streaming service smoothly.

For example, the user equipment may include a mobile phone, a smart phone, a laptop computer, a digital broadcasting terminal, a personal digital assistant (PDA), a portable multimedia player (PMP), a navigation, a slate PC, a tablet PC, an ultrabook, a wearable device (e.g., a watch-type terminal (smart watch), a glass-type terminal (smart glass), a head mounted display (HMD)), a digital TV, a desktop computer, a digital signage or the like. Each of servers in the contents streaming system may be operated as a distributed server, and in this case, data received by each server may be processed in distributed manner.

Claims disclosed herein can be combined in a various way. For example, technical features of method claims of the present disclosure can be combined to be implemented or performed in an apparatus, and technical features of apparatus claims can be combined to be implemented or performed in a method. Further, technical features of method claims and apparatus claims can be combined to be implemented or performed in an apparatus, and technical features of method claims and apparatus claims can be combined to be implemented or performed in a method.

The invention claimed is:

1. An image decoding method performed by a decoding apparatus, the method comprising:
   receiving picture order count (POC) information and information on a reference picture from a bitstream;
   deriving POC values for a current picture and the reference picture based on the POC information;
   constructing a reference picture list based on a POC value of the current picture and a POC value for the reference picture;
   deriving prediction samples for a current block by performing an inter prediction on the current block based on the reference picture list; and
   generating a reconstructed picture based on the prediction samples,
   wherein the POC information includes information for determining a maximum least significant bit (LSB) value of POC, and the information on the reference picture includes a non-reference picture flag related to whether a picture is not used as a reference picture,
   wherein a specific previous picture used to derive the POC value of the current picture is determined as a previous picture that has the non-reference picture flag equal to 0, has a temporal identifier (ID) equal to 0, and has a layer ID equal to a layer ID of the current picture,
   wherein the non-reference picture flag is obtained in a picture header for the reference picture,
   wherein a difference between POC values of the current picture and the specific previous picture is less than half of the maximum LSB value of the POC, and
   wherein a picture having a difference in POC value from the current picture that is greater than half of the maximum LSB value of the POC is not regarded as the specific previous picture.

2. The method of claim 1, wherein the previous picture is not a random access skipped leading (RASL) picture or random access decodable leading (RADL) picture.

3. The method of claim 1, wherein the POC value of the current picture is derived based on a variable POCMsb,
   wherein the variable POCMsb is derived based on a cycle present flag related to whether a POC most significant bit (MSB) cycle value is present and the POC MSB cycle value is signaled based on a cycle present flag value.

4. The method of claim 3, wherein when the value of the cycle present flag for the current picture is 0 and the current picture is not a coded layer video sequence start (CLVSS) picture, the variable POCMsb for the current picture is derived based on a variable POCMsb of the previous picture.

5. An image encoding method performed by an encoding apparatus, the method comprising:
   deriving picture order count (POC) values for a current picture and a reference picture;
   performing an inter prediction on a current block using the reference picture; and
   encoding POC information and information on the reference picture,
   wherein the POC information includes information for determining a maximum least significant bit (LSB) value of a POC and the information on the reference picture includes a non-reference picture flag related to whether a picture is not used as a reference picture,
   wherein a specific previous picture used to derive a POC value of the current picture is determined as a previous picture that has the non-reference picture flag equal to 0, has a temporal identifier (ID) equal to 0, and has a layer ID equal to a layer ID of the current picture,
   wherein the non-reference picture flag is signaled in a picture header for the reference picture,
   wherein a difference between POC values of the current picture and the specific previous picture is less than half of the maximum LSB value of the POC, and
   wherein a picture having a difference in POC value from the current picture that is greater than half of the maximum LSB value of the POC is not regarded as the specific previous picture.

6. The method of claim 5, wherein the previous picture is not a random access skipped leading (RASL) picture or random access decodable leading (RADL) picture.

7. The method of claim 5, wherein the POC value of the current picture is derived based on a variable POCMsb,
   wherein the variable POCMsb is derived based on a cycle present flag related to whether a POC most significant bit (MSB) cycle value for the current picture is present and the POC MSB cycle value for the current picture.

8. The method of claim 7, wherein when the cycle present flag for the current picture is not present and the current picture is not a coded layer video sequence start (CLVSS) picture, the variable POCMsb for the current picture is derived based on a variable POCMsb of the previous picture.

9. A method for transmitting data for image information comprising:

generating a bitstream for the image information, wherein the bitstream is generated based on deriving picture order count (POC) values for a current picture and a reference picture, performing an inter prediction on a current block using the reference picture, and encoding POC information and information on the reference picture; and transmitting the data including the bitstream, wherein the POC information includes information for determining a maximum least significant bit (LSB) value of a POC and the information on the reference picture includes a non-reference picture flag related to whether a picture is not used as a reference picture, wherein a specific previous picture used to derive a POC value of the current picture is determined as a previous picture that has the non-reference picture flag equal to 0, has a temporal identifier (ID) equal to 0, and has a layer ID equal to a layer ID of the current picture, wherein the non-reference picture flag is signaled in a picture header for the reference picture, wherein a difference between POC values of the current picture and the specific previous picture is less than half of the maximum LSB value of the POC, and wherein a picture having a difference in POC value from the current picture that is greater than half of the maximum LSB value of the POC is not regarded as the specific previous picture.

* * * * *